Figure 3:
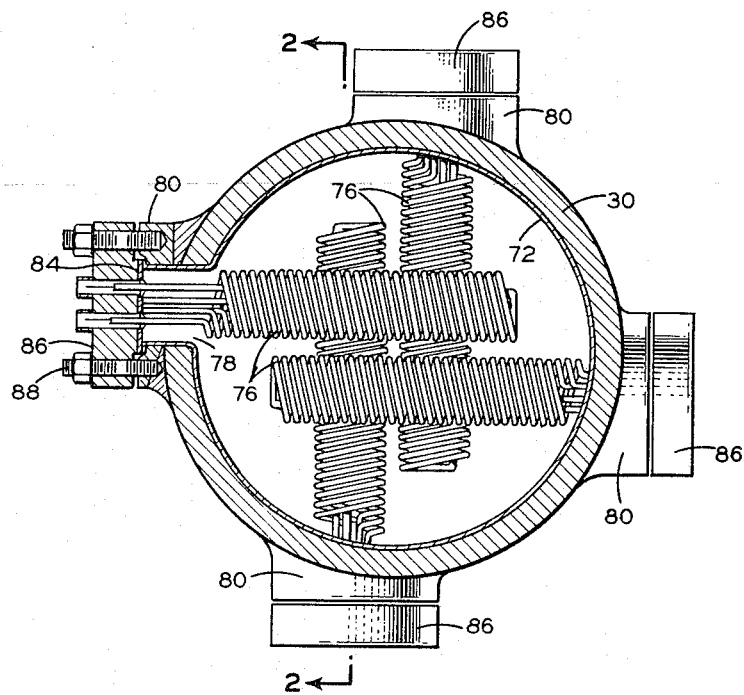

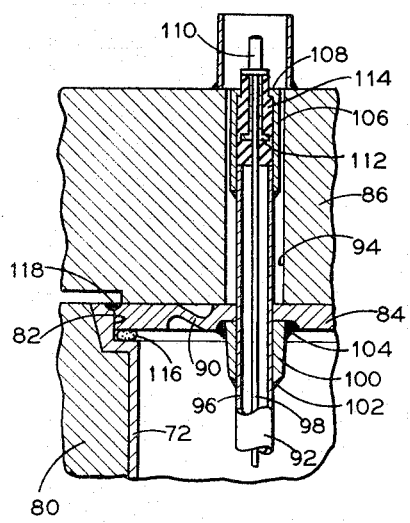
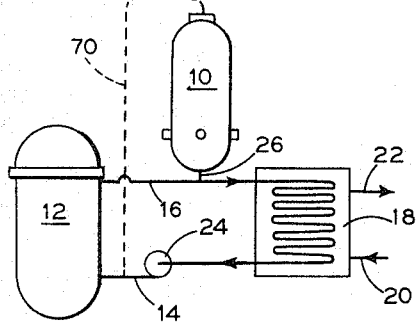
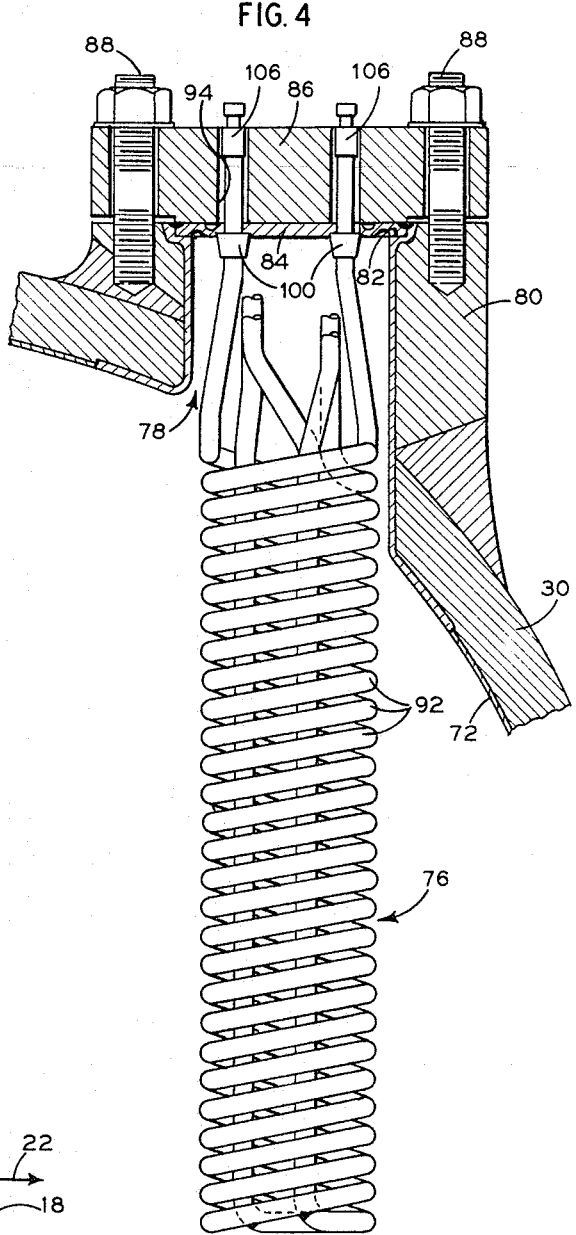
INVENTORS
John W. Leonard, Jr.
Johannes H. Ammon
BY
ATTORNEY

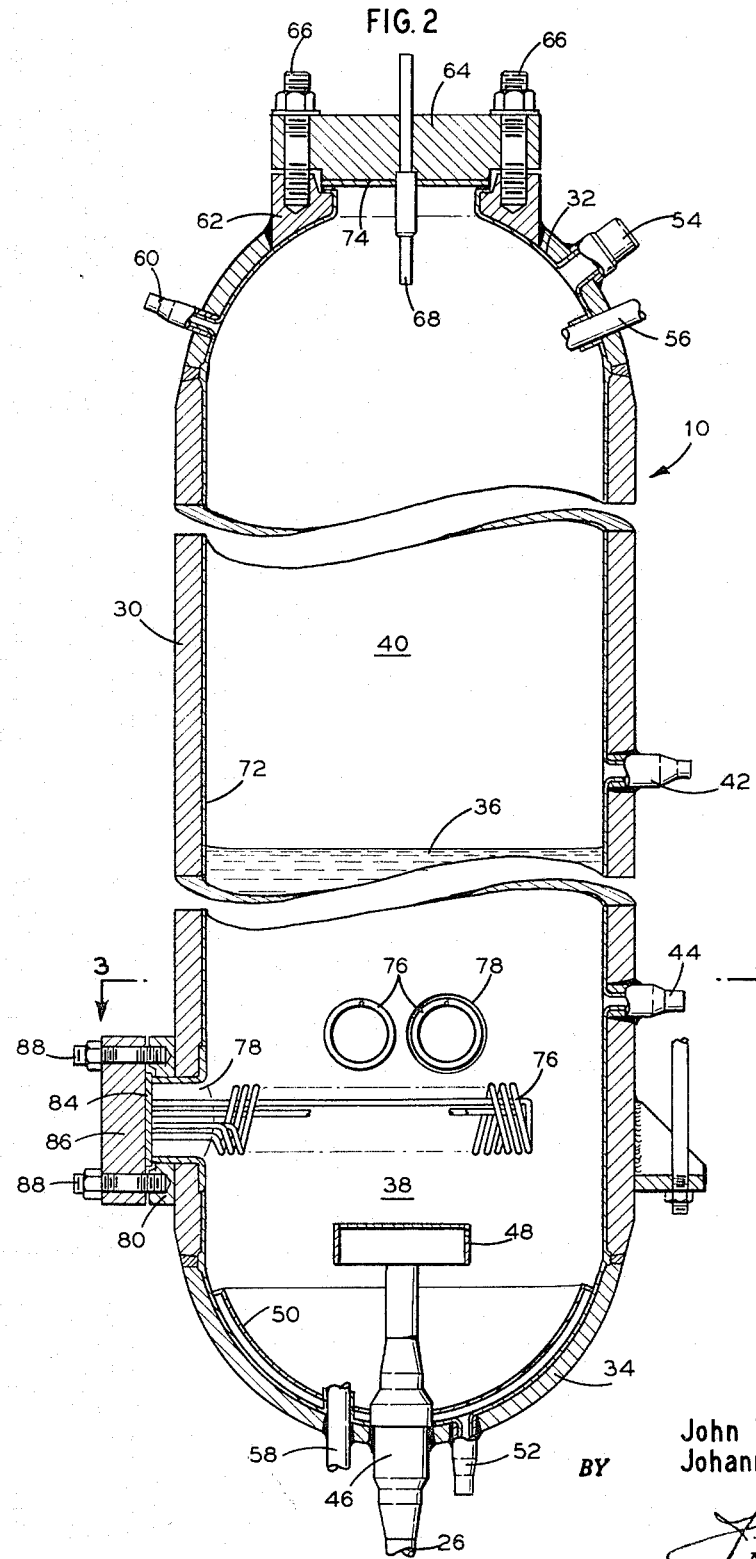

Feb. 21, 1967  J. W. LEONARD, JR., ETAL  3,305,002
FLUID PRESSURIZER
Filed May 31, 1961  4 Sheets-Sheet 3

*INVENTORS*
John W. Leonard, Jr.
Johannes H. Ammon

BY

*ATTORNEY*

Feb. 21, 1967  J. W. LEONARD, JR., ETAL  3,305,002
FLUID PRESSURIZER
Filed May 31, 1961  4 Sheets-Sheet 4
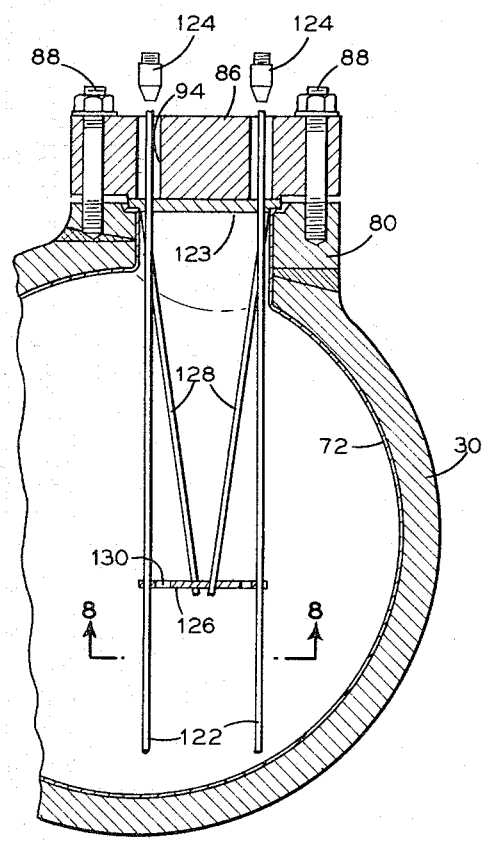
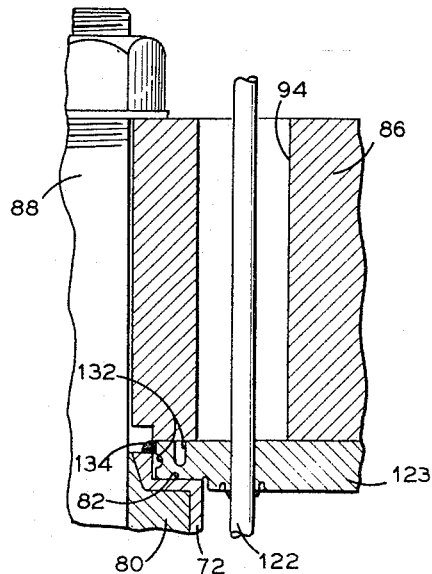
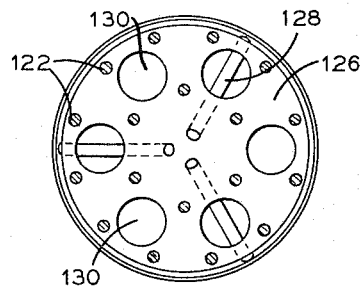
INVENTORS
John W. Leonard Jr.
Johannes H. Ammon
BY
ATTORNEY 3,305,002
FLUID PRESSURIZER
John W. Leonard, Jr., Wadsworth, and Johannes H. Ammon, Akron, Ohio, assignors to The Babcock & Wilcox Company, New York, N.Y., a corporation of New Jersey
Filed May 31, 1961, Ser. No. 113,842
6 Claims. (Cl. 165—30)

This invention relates in general to a fluid pressurizer and more particularly to a fluid pressurizer for use in a pressurized water type of nuclear steam generator, its function being to establish and maintain the primary coolant system of the nuclear generator at a pressure whose corresponding saturation temperature is above the operating temperature of the reactor and thereby prevent boiling of the coolant within the core during warm up, steady state operation, load changes, and shutdown. The fluid pressurizer in accordance with this invention comprises essentially a pressurizer vessel, a heating source, surge line, and spray line.

In a pressurized water nuclear steam generator it is desirable to maintain the system pressure within specified limits. This is accomplished by the use of the pressurizer of the present invention which may be characterized as a steam boiler with zero steam flow. The pressurizer is connected to the primary coolant system of the nuclear system generator by a surge line which transmits pressure between the pressurizer and the primary coolant system. The surge line is of a size such that while it will transmit pressure between the pressurizer and the primary coolant system it will limit the interchange of fluid therebetween. In this way loss of heat generated in the pressurizer by circulation of the pressurizer fluid into the primary coolant system is minimized. Should the pressure in the reactor primary coolant system drop below a desired minimum value, the heaters in the pressurizer generate steam to restore the system pressure to the desired normal value. Conversely, should the system pressure rise above a maximum value, a spray line injects water into the steam space to cool the vapor in the pressurizer and thus reduce the system pressure to the normal value.

In prior art pressurizer arrangements the heaters are of a cartridge type individually inserted in wells extending through the vessel walls. Based on the capacity of a single heater and the total required capacity per pressurizer, the number of single heaters may vary between 100 and 200. These heaters are usually installed in a non-radial direction and require thermal sleeves which are welded into the shell penetrations from the inside of the shell. The fabrication of such a pressurizer with well type heaters is difficult and costly in that each heater requires an opening to be formed through the pressure vessel wall and multiple welds to attach the well, the thermal sleeve, and the heater to the vessel. Additionally, the use of large numbers of heaters increases the cost by increasing the circuitry and controls required. Further, the use of such a large number of pressure vessel wall penetrations adds to the weight and cost of the vessel by requiring thicker wall sections to provide the necessary structural strength between the penetrations. Also, output per heater, in the well type design, is reduced below the theoretical value for such a heater due to the fact that the well prevents direct heat exchange between the heater and the water and acts as a thermal barrier.

The pressurizer arrangements utilizing the well type heaters have the further disadvantage of requiring extensive and costly maintenance. Where the heaters extend through the bottom of the pressure vessel, the possibility of radioactive material collecting in the bottom is increased with the increased possibility of corrosion occurring in crevices in the heater well and the thermal sleeve. With such a possibility of corrosion increased, so does the frequency of replacing the heaters. Such replacement requires the removal of the reactor from operation and the draining of the pressurizer to permit maintenance thereon.

Accordingly the present invention provides a pressurizer for use in a pressurized liquid system comprising walls forming a vertically elongated cylindrical vessel adapted to contain a body of vaporizable liquid having a liquid level separating a lower liquid space from an upper vapor space, a combined surge inlet and outlet line terminating the lower liquid space of the vessel and communicating with the pressurized liquid system, an opening in the wall of said vessel below the liquid level, an immersion type heater bundle disposed within the liquid space of the vessel, the heater bundle being removably supported through the opening in the vessel wall, and a closure means for sealingly closing the opening around the heater.

Further, the opening in the vessel wall is provided with a diaphragm removably engaging the walls at the opening to close and seal the opening, and a pressure retaining flange removably attached to the wall to maintain the diaphragm in engagement with the wall to seal the opening.

The heater bundles lie along a horizontal chord of the cylindrical vessel and are integrally attached to and supported therein by the diaphragm which is used to close the opening in the vessel wall.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described preferred embodiments of the invention.

Figure 6:
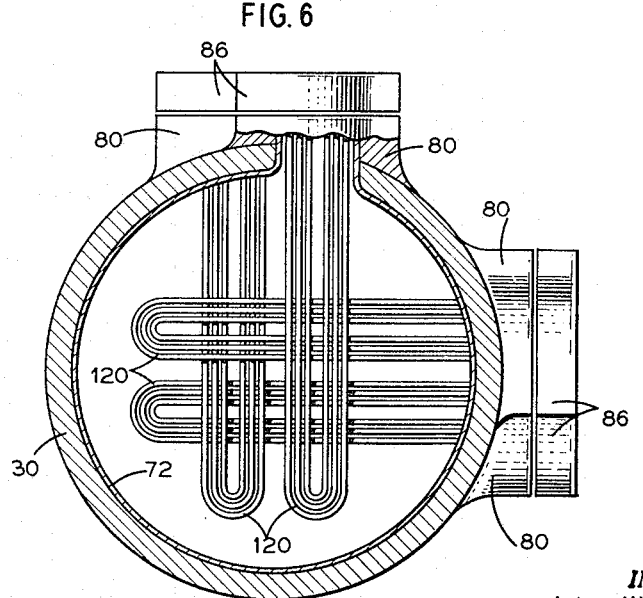

Of the drawings:
FIG. 1 is a schematic showing the pressurizer of the present invention in relation to a pressurized water type of nuclear reactor primary coolant system;
FIG. 2 is a vertical cross sectional view of the present invention;
FIG. 3 is a horizontal cross sectional view taken along line 3—3 of FIG. 2;
FIG. 4 is an enlarged view of a heater bundle and pressure vessel wall opening and closure of the present invention;
FIG. 5 is an enlarged detail of an end of the heater bundle shown in FIG. 4;
FIG. 6 is a horizontal cross sectional view of an alternate arrangement of the heater bundles of the present invention;
FIG. 7 is a view corresponding to FIG. 4, showing an alternate type of heater bundle;
FIG. 8 is an end view of the alternate heater bundle taken along line 8—8 of FIG. 7; and
FIG. 9 is an enlarged detail of an end of the heater bundle shown in FIG. 7.

Referring to FIG. 1, a primary coolant system of a pressurized water type nuclear steam generator is schematically illustrated to show the position of pressurizer 10, in relation to the remainder of the system. The primary coolant system includes a nuclear reactor 12 connected via an inlet line 14 and an outlet line 16 to a heat exchanger 18. Primary coolant fluid is heated in the reactor 12 by the nuclear fission occurring therein and passes to the heat exchanger 18 through line 16. Heat contained in the primary fluid is given up via indirect heat transfer to a secondary coolant fluid flowing through the secondary side of the heat exchanger 18. This secondary fluid enters the heat exchanger through line 20, is heated by the primary fluid, and leaves by line 22 for point of use, as in a steam turbine (not shown). After the primary coolant leaves the heat exchanger 18, it is circulated by a pump 24 through line 14 back to the reactor 12, completing the cycle. The pressurizer 10 is connected to the outlet line 16 of the primary coolant system via a surge line 26.

The pressurizer 10, to be decribed, is provided to establish and maintain the primary coolant system within predetermined pressure limits throughout the entire operating cycle, i.e., during (1) warmup, (2) steady state operation, (3) changes in load, and (4) shutting down. The pressurizer also compensates for increases or decreases in the volume of the primary coolant as its density varies in accordance with changes in the average temperature of the primary coolant. Thus, boiling is prevented in the primary coolant system and any changes in the density thereof are compensated by changes in the relative volumes occupied by the saturated steam and water fractions within the pressurizer.

In FIG. 2 there is shown the pressurizer, generally indicated by 10, of the present invention comprising a pressure vessel having a vertically extending circular wall 30, closed at either end by hemispherical heads 32 and 34, respectively. The pressure vessel is adapted to contain a body of vaporizable liquid having a liquid level 36 which divides the vessel volume into a lower liquid space 38 and an upper vapor space 40. While the location of the liquid level in the vessel might vary somewhat depending on the temperature in the primary coolant system, during operation it would be controlled within the limits of the liquid level connections 42 and 44.

Disposed centrally of the bottom head 34 is a thermal sleeve connection 46, which has one end communicating with the interior of the vessel in the lower liquid space 38 and the other end connecting, exterior of the vessel, to the combined inlet and outlet surge line 26 which, in turn, connects to the outlet line 16 of the primary coolant system as shown in FIG. 1. At the extremity of the surge line within the vessel, a baffle means 48 is connected to deflect insurging fluid downward thereby minimizing fluctuations in the liquid level 36. A thermal shield plate 50 is positioned adjacent the inner surface of the lower head 34 to protect this head from thermal shock should the isurging fluid, deflected downwardly by the baffle means 48, be of a substantially different temperature than that of the vessel wall.

Also provided in the lower head 34 is a drain connection 52 for draining the vessel for inspection or repair. A vent connection 54, equipped with a safety valve (not shown), is provided in the upper head 32 to protect the system from overpressure.

Temperature connections 56 and 58 are provided in the upper and lower heads, respectively, for monitoring the temperatures in the liquid and the vapor spaces within the vessel and thus facilitate the control of the system pressure as will hereinafter be described. Also penetrating the upper head 32 is a pressure sensing connection 60 for the measurement of the pressure in the pressurizer.

In the upper head 32 of the pressurizer, a nozzle 62 is positioned to form a manway opening which provides access to the interior of the vessel. This nozzle is provided with a closure member 64 which may be secured to the nozzle by bolts 66 so as to form a pressure and fluid tight seal. Penetrating the closure member 64 and positioned and secured thereto is a spray means 68 adapted to introduce a cooling fluid into the vapor space 40 as will be further described hereinbelow. This spray means may be supplied from the primary water make-up system (not shown) or from the primary pump discharge line 14 (in FIG. 1) via line 70.

In certain applications of the pressurizer of the present invention the fluid involved is highly corrosive and must be contained in a corrosion resistant system. Even pressurized water, of a very high purity, exhibits corrosion characteristics and must be contained by stainless steel systems rather than carbon steel. Such systems may be completely fabricated of stainless steel alloys, but due to their high cost it is customary to provide a pressure vessel of a structural metal, such as carbon steel, having an inner lining or cladding of a corrosion resistant metal, such as stainless steel, on those portions subjected to the action of the corrosive fluid. Such cladding is shown at 72 applied to the ordinary carbon steel wall 30 of the pressure vessel.

When a clad vessel is employed, it is desirable to provide openings (as manway 62) with a diaphragm seal plate 74, and it is to this diaphragm that the nozzle 68 is secured or attached rather than to the closure member 64. This diaphragm seal plate would be formed of stainless steel, or other corrosion resistant metal, while the closure member would be formed of the structural metal of the vessel. The diaphragm is also adapted to accommodate differential expansion, as might occur between two different metals, and will be further described hereinbelow.

According to the present invention, a plurality of immersion type heater bundles 76 are disposed horizontally in the lower portion of the liquid space 38. Referring to FIGS. 2, 3 and 4, wherein like reference numbers are used for similar parts in the various views, it is seen that the horizontal heater bundles 76 are disposed chordally with respect to the cylindrical wall of the pressure vessel. Each of the heater bundles is supported through a circular reinforced opening 78 in the circumferential wall 30 of the vessel, the reinforcement being in the form of a nozzle 80 integrally attached thereto at each opening. Each nozzle 80 is provided with a seat 82, see FIGS. 4 and 5, in the outer surface thereof into which is positioned a sealing diaphragm member 84. This diaphragm is held in the seat 82 by a pressure retaining flange 86 which is removably attached to the nozzle 80 as by bolts 88. In a situation, as described above, where the pressure vessel is provided with a corrosion resistant lining 72, such as stainless steel, the diaphragm 84 will also fabricated of the same corrosion resistant material as that of the lining 72 while the pressure retaining flange 86 is fabricated of the same structural material as the pressure vessel wall 30. In such a case, wherein the closure for the opening 78 in the pressure vessel wall is formed of two separate pieces of different materials, the diaphragm 84 is provided with a corrugation 90 (see FIG. 5) concentric with its outer circumference to accommodate differential movement between the two members such as might be caused by differential thermal expansion between the two different materials.

As may be seen in FIGS. 2 and 3, the immersion heater bundles 76 are disposed along horizontal chords in two separate planes of the pressure vessel in such a way that they will not come into contact one with another nor with the pressure vessel upon thermal expansion thereof. If necessary, support members (not shown) extending between the vessel walls might be provided to limit deflection of the coils.

Referring to FIG. 6, which shows four heater bundles disposed in four distinct horizontal planes within the pressure vessel, it is readily apparent that there are many possible combinations of arrangements of the heater bundles in horizontal planes which eliminate interference of heater elements due to thermal expansion and yet which permit wide spacing of the openings in the pressure vessel wall through which the bundles are inserted. It will be appreciated that with the wide spacings of the comparatively few openings it is possible, for a given design pressure, to fabricate the pressure vessel of thinner material than that required where a great number of closely spaced openings are provided, as in previous pressurizer designs.

Referring back to FIG. 4, which shows an enlarged view of the immersion heater bundle 76 and the vessel closure as shown in FIGS. 2 and 3, it is seen that the heater bundle comprised of a plurality of individual heater elements 92 helically coiled around a common axis. Each heater element is integrally attached to and supported by the diaphragm member 84 through which it passes. The pressure retaining flange 86 is provided with openings 94 in alignment with the extending portions of the heater elements exterior of the diaphragm and is adapted to permit passage of the heater element terminals therethrough when the flange is drawn up to the nozzle 80 by the bolts to form a sealed joint between the diaphragm and the seat 82.

An enlarged detail of the connection of a typical electric heater element 92 to the diaphragm 84 and of the sealing fit between the diaphragm and the seat 82 in the outer face of the nozzle 80 is shown in FIG. 5. The heater element 92 is of a type well known in the art and consists of an outer, tubular covering sheath 96 and a central resistance wire 98, with a compacted electrical insulation material filling the annulus therebetween. A liquid and pressure tight seal is provided to attach the heater element to the diaphragm 84, which seal comprises a sleeve 100 welded to the heater sheath 96 at 102 and to the diaphragm at 104. The heater element extends through the diaphragm and out through the opening 94 provided in the pressure retaining flange 86 where it terminates in an outer seal. This seal provides both for connection to an outside source of electric power and for protection against fluid leakage should a break occur in the heater sheath within the pressure vessel and subject the terminal of the heater element to the differential pressures existing between the interior and the exterior of the pressure vessel. This outer seal comprises an outer sleeve 106 welded to the end of the heater sheath and having an outer flanged end 108. A terminal connection 110 is attached directly to the end of the heater wire 98 and has an inner flanged end 112 of such size as to prevent it from passing through the flanged end 108 of the outer sleeve 106. The annular space between the outer sleeve 106 and the terminal connection is filled with a ceramic insulator 114 to prevent a short circuit from occurring between the heater wire and the heater sheath.

The pressure and fluid tight seal between the diaphragm 84 and the seat 82 may be obtained by the use of a gasket 116 disposed therebetween and/or a seal weld 118 made around the circumference of the diaphragm should be the type of service require this refinement. Should it then be necessary to replace the heater bundle, the pressure retaining flange would be removed from the nozzle, the seal weld removed by grinding, if necessary, and the diaphragm and heater bundle removed from the pressure vessel.

While FIGS. 2, 3 and 4 have shown a heater bundle in which the heater elements were wound helically around a common axis, an alternate arrangement of heater bundles 120 having horizontal U-shaped heater elements arranged around a common axis, as shown in FIG. 6 could be used. Both types of heaters may be arranged to receive their heat energy either by means of an electric power source or by the actions of a hot fluid flowing through the tubular elements.

A further alternate arrangement is shown in FIG. 7 wherein straight heater elements 122, used to make up the heater bundle, are attached through another type of sealing diaphragm 123 than diaphragm 84 mentioned in connection with the heater bundles shown in FIGS. 3 and 6. Whereas, in the previous bundles described, the electric heaters were of a single wire type requiring both ends of the heater element to be connected to the power source, the heater elements 122 of this arrangement are of a double wire type having both connections made at one end of the element through a standard connection designated as 124. In order to support this heater it is necessary to provide a support plate 126 positioned at a distance from the diaphragm plate equal to approximately two-thirds the length of the heater elements. This support plate, shown in detail in FIG. 8, is held in position by three support rods 128, arranged in tripod fashion with their ends integrally attached to the diaphragm 123 and to the support plate 126 respectively. The support plate also has a plurality of openings 130 therethrough which minimizes the mass of metal in the liquid space of the pressure vessel and permits the circulation of cooling liquid thereabout.

FIG. 9 shows a detail of the alternate type diaphragm 123 with the straight header elements 122 attached thereto. The heater elements are welded directly to this diaphragm with provision for differential expansion provided by corrugations 132 concentric with and adjacent the outer circumference of the diaphragm. A corrugation of this type might in some intances, be easier to machine in the diaphragm and would thus be less costly while still providing the same protection. With the use of this type of diaphragm 123, it would be necessary to provide a seal weld 134 to make the joint between the seat 82 and the diaphragm 123, absolutely leak tight.

Prior to operation, the pressurizer is filled with water, to a level approximating line 36 located between the water level indicator connections 42 and 44, via the surge line 26 from the primary coolant system which is supplied from an external source (not shown). To increase the pressure in the pressurizer, and thereby the pressure in the primary coolant system which is connected to the pressurizer by the surge line 26, the heater bundles 76 are energized. This heats the water in the liquid portion of the pressurizer and generates steam, which collects in the vapor portion thereof. A liquid level controller, of a type well known in the art, maintains the water level in the pressurizer between the upper and lower water level indicator connections 42 and 44 by regulating the net blow-down from and make-up liquid flow into the primary system. A pressure sensitive means, responsive to the pressure in the pressurizer and the primary system, controllably energizes the heaters and the spray nozzle 68 in the pressurizer to maintain the system pressure within predetermined limits. Should the pressure tend to increase over the upper limit, the spray nozzle 68 is automatically opened injecting relatively cooler liquid into the vapor space of the pressurizer, condensing some of the vapor and thus reducing the system pressure. Should the pressure tend to fall below the lower limit, the heater bundles are energized, either selectively or simultaneously, depending upon the amount of pressure decrease, generating more steam and thus increasing the system pressure.

The pressurizer also provides a surge vessel to supply a volume of liquid to the primary system should the liquid therein suddenly contract due to a decrease in its average temperature. Conversely, should the primary coolant system average temperature suddenly increase, the pressurizer vessel would provide a surge volume to accept the increased volume of liquid resulting therefrom.

The present invention permits the use of a plurality of immersion type heaters arranged in bundles and disposed in the lower part of the pressure vessel. As a result of the higher output obtainable from these immersion type heaters, as compared to the well type heaters of the prior art, fewer heaters are required for the same capacity pressurizer. As for a result of this reduction in number of heaters less space is occupied within a given size pressurizer resulting in a larger surge volume available for compensating volume changes within the primary coolant system with less danger of uncovering the heater bundles with the subsequent possibility of heater burnout or, conversely, a smaller and lighter pressurizer for a given surge volume requiremnt. Additional advantages of using a relatively fewer number of heaters arranged in bundle form permits reduction in the number of pressure vessel wall penetration which reduces the thickness of the vessel wall required. As previously described, this method of arranging the heater bundles within the pressure vessel reduces the fabrication cost and time by eliminating many of the welded joints required in previous designs. A further reduction in cost and in the complexity of the apparatus is achieved by a reduction in the number of electrical connections required exterior of the vessel as well as by the reduced number of heaters within the vessel.

The utilization of a plurality of heater bundles, each integrally attached to diaphragm sealing members held in place by a pressure retaining flange permits heaters to be replaced, should the need ever arise, quickly and relatively easily, requiring only the removal of the pressure retaining flange and the cutting of a seal weld, after which the heater bundle could be removed.

Further the use of a separate corrugated diaphragm member fabricated of the same corrosion resistant material as that used for cladding the vessel, in association with the structural pressure retaining flange provides a closure for vessel openings that accommodates the requirements of both flexibility and corrosion resistance, and at the same time affords a simple, effective pressure and fluid tight seal.

While the present invention has been described in relation to, and as associated with a nuclear reactor, it may be utilized in any system requiring pressurization or the net generation of steam.

While in accordance with the provisions of the statutes we have illustrated and described herein the best forms and modes of operation of the invention now known to us, those skilled in the art will understand that changes may be made in the forms of the apparatus disclosed without departing from the spirit of the invention covered by our claims, and that certain features of our invention may sometimes be used to advantage without a corresponding use of other features.

What is claimed is:

1. In combination with a pressurized closed liquid system, a pressurizer comprising walls forming a vertically elongated cylindrical pressure vessel with a circumferential wall of uniform thickness, a combined surge inlet and outlet line terminating in the lowermost portion of said vessel and communicating with said pressurized liquid system, said pressure vessel containing a portion of said liquid in said system, said liquid in said pressure vessel being vaporizable and having a liquid level separating a lower liquid space from an upper vapor space, a plurality of openings in the circumferential wall of said vessel below said liquid level, a plurality of heater bundles removably supported in said liquid space, each of said heater bundles comprising a plurality of heaters each comprising an integral sheath and heating means disposed therewithin and extending through each of said circular openings and immersed directly in said vaporizable liquid, each of said openings having a cross-sectional area many times the cross-sectional area of an individual sheath, removable closure means for sealingly closing each of said openings around said heater bundles, and means for separately sealing the ends of each of said sheaths to the inner side of said closure means.

2. In combination with a pressurized closed liquid system, a pressurizer comprising walls forming a vertically elongated cylindrical pressure vessel with a circumferential wall of uniform thickness, a combined surge inlet and outlet line terminating in the lowermost portion of said vessel and communicating with said pressurized liquid system, said pressure vessel containing a portion of said liquid in said system, said liquid in said pressure vessel being vaporizable and having a liquid level separating a lower liquid space from an upper vapor space, a plurality of openings in the circumferential wall of said vessel below said liquid level, a plurality of heater bundles removably supported in said liquid space, each of said heater bundles comprising a plurality of heaters each comprising an integral sheath and heating means disposed therewithin and extending through each of said circular openings and immersed directly in said vaporizable liquid, each of said openings having a cross-sectional area many times the cross-sectional area of an individual sheath, said sheath of each heater bundle being helically coiled about a common axis, removable closure means for sealingly closing each of said openings around said heater bundles, and means for separately sealing the ends of each of said sheaths to the inner side of said closure means, each of said heater bundles lying along a horizontal chord of said pressure vessel.

3. In combination with a pressurized closed liquid system, a pressurizer comprising walls forming a vertically elongated cylindrical pressure vessel with a circumferential wall of uniform thickness, a combined surge inlet and outlet line terminating in the lowermost portion of said vessel and communicating with said pressurized liquid system, said pressure vessel containing a portion of said liquid in said system, said liquid in said pressure vessel being vaporizable and having a liquid level separating a lower liquid space from an upper vapor space, a plurality of openings in the circumferential wall of said vessel below said liquid level, a plurality of heater bundles removably supported in said liquid space, each of said heater bundles comprising a plurality of heaters each comprising an integral sheath and heating means disposed therewithin and extending through each of said circular openings and immersed directly in said vaporizable liquid, each of said openings having a cross-sectional area many times the cross-sectional area of an individual sheath, said sheath of each heater bundle being helically coiled about a common axis, removable closure means for sealingly closing each of said openings around said heater bundles, and means for separately sealing the ends of each of said sheaths to the inner side of said closure means, said heater bundles lying along horizontal chords of said pressure vessel and in a plurality of horizontal planes.

4. In combination with a pressurized closed liquid system, a pressurizer comprising walls forming a vertically elongated cylindrical pressure vessel with a circumferential wall of uniform thickness, a combined surge inlet and outlet line terminating in the lowermost portion of said vessel and communicating with said pressurized liquid system, said pressure vessel containing a portion of said liquid in said system, said liquid in said pressure vessel being vaporizable and having a liquid level separating a lower liquid space from an upper vapor space, a spray nozzle in said upper vapor space, means for variably supplying liquid from said system to said nozzle to condense said vapor in said pressure vessel, a plurality of circular openings in the circumferential wall of said vessel below said liquid level, a plurality of heater bundles removably supported in said liquid space, each of said heater bundles comprising a plurality of heaters each comprising an integral sheath and heating means disposed therewithin and extending through each of said circular openings and immersed directly in said vaporizable liquid, each of said openings having a cross-sectional area many times the cross-sectional area of an individual sheath, said sheath of each heater bundle being helically coiled about a common axis, removable closure means for sealingly closing each of said openings around said heater bundles, and means for separately sealing the ends of each of said sheaths to the inner side of said closure means, said heater bundles lying along horizontal chords of said pressure vessel and in a plurality of horizontal planes.

5. In combination with a pressurized closed liquid system, a pressurizer comprising walls forming a vertically elongated cylindrical pressure vessel with a circumferential wall of uniform thickness, a combined surge inlet and outlet line terminating in the lowermost portion of said vessel and communicating with said pressurized liquid system, said pressure vessel containing a portion of said liquid in said system, said liquid in said pressure vessel being vaporizable and having a liquid level separating a lower liquid space from an upper vapor space, a spray nozzle in said upper vapor space, means for variably supplying liquid from said system to said nozzle to condense said vapor in said pressure vessel, a plurality of circular openings in the circumferential wall of said vessel below said liquid level, a circular metal diaphragm removably engaging said pressure vessel one at each of said openings to close and seal said openings, a plurality of heater bundles removably supported in said liquid space, each of said heater bundles comprising a plurality of heaters each comprising an integral sheath and heating means disposed therewithin and integrally attached through said diaphragms and supported thereby through each of said circular openings and immersed directly in said vaporizable liquid, each of said openings having a cross-sectional area many times the cross-sectional area of an individual sheath, said sheath of each heater bundle being helically coiled about a common axis, removable closure means for sealingly closing each of said openings around said heater bundles, and means for separately sealing the ends of each of said sheaths to the inner side of said diaphragms, said heater bundles lying along horizontal chords of said pressure vessel and in a plurality of horizontal planes.

6. In combination with a pressurized closed liquid system, a pressurizer comprising walls forming a vertically elongated cylindrical pressure vessel with a circumferential wall of uniform thickness, a combined surge inlet and outlet line terminating in the lowermost portion of said vessel and communicating with said pressurized liquid system, said pressure vessel containing a portion of said liquid in said system, said liquid in said pressure vessel being vaporizable and having a liquid level separating a lower liquid space from an upper vapor space, a spray nozzle in said upper vapor space, means for variably supplying liquid from said system to said nozzle to condense said vapor in said pressure vessel, a plurality of circular openings in the circumferential wall of said vessel below said liquid level, a circular metal diaphragm removably engaging said pressure vessel one at each of said openings to close and seal said openings, a plurality of heater bundles removably supported in said liquid space, each of said heater bundles comprising a plurality of electric heaters each comprising an integral sheath and electric heating means disposed therewithin and helically coiled around a common imaginary axis and integrally attached through said diaphragms and supported thereby through each of said circular openings and immersed directly in said vaporizable liquid, means for separately sealing the ends of each of said sheaths to the inner side of said diaphragm, and a plurality of pressure retaining flanges removably engaging said diaphragms and removably attached to said pressure vessel wall to maintain said diaphragms in sealing engagement at said openings, the axis of said heater bundles lying along horizontal chords of said pressure vessel and in a plurality of horizontal planes.

References Cited by the Examiner
UNITED STATES PATENTS

| | | | |
|---|---|---|---|
| 153,776 | 8/1874 | Mason | 165—83 |
| 1,840,305 | 1/1932 | Andrus et al. | |
| 1,911,608 | 5/1933 | Davis et al. | |
| 2,252,541 | 8/1951 | Arnold | 219—359 |
| 2,345,507 | 3/1944 | Smith. | |
| 2,434,016 | 1/1948 | Shields | 257—1.35 |
| 3,098,578 | 7/1963 | Rudelick | 220—63 |

OTHER REFERENCES

"Proceedings of International Conference on the Peaceful Uses of Atomic Energy" held in Geneva August 8, August 20, 1955, vol. 3, page 221, published by United Nations, New York, 1955.

MEYER PERLIN, *Primary Examiner.*

CHARLES SUKALO, FREDERICK L, MATTESON, JR., *Examiners.*